United States Patent [19]

Drumheller

[11] Patent Number: 5,056,067

[45] Date of Patent: Oct. 8, 1991

[54] ANALOG CIRCUIT FOR CONTROLLING ACOUSTIC TRANSDUCER ARRAYS

[75] Inventor: Douglas S. Drumheller, Cedar Crest, N. Mex.

[73] Assignee: Teleco Oilfield Services Inc., Meriden, Conn.

[21] Appl. No.: 619,172

[22] Filed: Nov. 27, 1990

[51] Int. Cl.[5] .......... G01V 1/40

[52] U.S. Cl. .......... 367/82; 340/853

[58] Field of Search .......... 367/82, 164, 191, 912; 310/317; 340/853, 856, 857, 861

[56] References Cited

U.S. PATENT DOCUMENTS

| | | | |
|---|---|---|---|
| 3,790,930 | 2/1974 | Lamel et al. | 367/82 |
| 3,900,827 | 8/1975 | Lamel et al. | 367/82 |
| 3,930,220 | 12/1975 | Shawhan | 367/82 |
| 4,314,365 | 2/1982 | Petersen et al. | 367/82 |

*Primary Examiner*—Ian J. Lobo

*Attorney, Agent, or Firm*—Fishman, Dionne & Cantor

[57] ABSTRACT

A simplified ananlog circuit is presented for controlling electromechanical transducer pairs in an acoustic telemetry system. The analog circuit of this invention comprises a single electrical resistor which replaces all of the digital components in a known digital circuit. In accordance with this invention, a first transducer in a transducer pair of array is driven in series with the resistor. The voltage drop across this resistor is then amplified and used to drive the second transducer. The voltage drop across the resistor is proportional and in phase with the current to the transducer. This current is approximately 90 degrees out of phase with the driving voltage to the transducer. This phase shift replaces the digital delay required by the digital control circuit of the prior art.

10 Claims, 6 Drawing Sheets

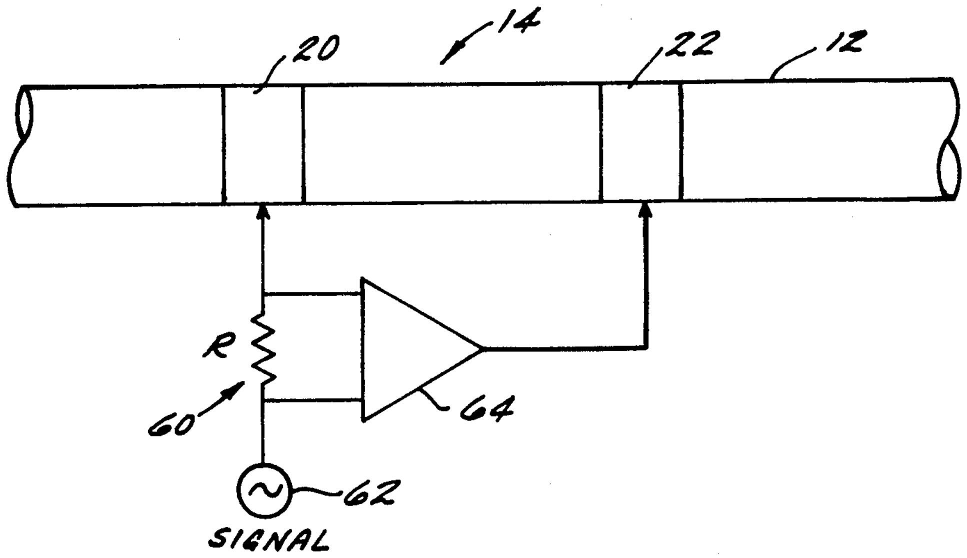
FIG. 2 - TRANSMITTER
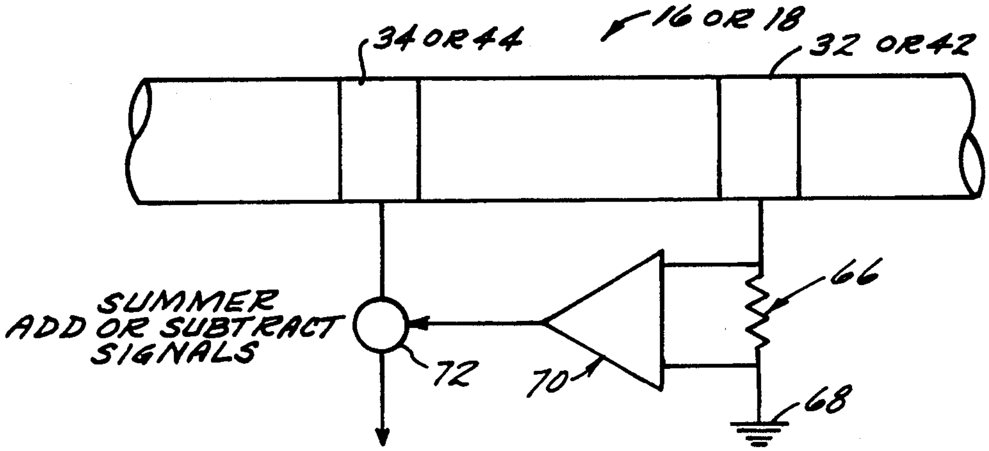
FIG. 3 RECEIVER

ANALOG CIRCUIT FOR CONTROLLING ACOUSTIC TRANSDUCER ARRAYS

BACKGROUND OF THE INVENTION

This invention relates generally to a system for acoustically transmitting data along a drill string, and more particularly to an analog circuit for controlling acoustic transducer arrays used for transmitting and receiving data signals through a drill string.

Deep wells of the type commonly used for petroleum or geothermal exploration are typically less than 30 cm (12 inches) in diameter and on the order of 2 km (1.5 miles) long. These wells are drilled using drill strings assembled from relatively light sections (either 30 or 45 feet long) of drill pipe that are connected end-to-end by tool joints, additional sections being added to the uphole end as the hole deepens. The downhole end of the drill string typically includes a drill collar, a dead weight assembled from sections of relatively heavy lengths of uniform diameter collar pipe having an overall length on the order of 300 meters (1000 feet). A drill bit is attached to the downhole end of the drill collar, the weight of the collar causing the bit to bite into the earth as the drill string is rotated from the surface. Sometimes, downhole mud motors or turbines are used to turn the bit. Drilling mud or air is pumped from the surface to the drill bit through an axial hole in the drill string. This fluid removes the cuttings from the hole, provides hydrostatic head which controls the formation gases, and sometimes provides cooling for the bit.

Communication between downhole sensors of parameters such as pressure or temperature and the surface has long been desirable. Various methods that have been tried for this communication include electromagnetic radiation through the ground formation, electrical transmission through an insulated conductor, pressure pulse propagation through the drilling mud, and acoustic wave propagation through the metal drill string. Each of these methods has disadvantages associated with signal attenuation, ambient noise, high temperatures, and compatibility with standard drilling procedures. The most commercially successful of these methods has been the transmission of information by pressure pulse in the drilling mud (known as mud pulse telemetry). However, attenuation mechanisms in the mud limit the transmission rate.

Faster data transmission may be obtained by the use of acoustic wave propagation through the drillstring. While this method of data transmission has heretofore been regarded as impractical, a significantly improved method and apparatus for the acoustic transmission of data through a drillstring is disclosed in U.S. patent application Ser. No. 605,255 filed Oct. 29, 1990, entitled "Acoustic Data Transmission Through a Drillstring" and invented by Douglas Drumheller, (all of the contents of which are fully incorporated herein by reference). The method and apparatus disclosed in this patent application will permit large scale commercial use of acoustic telemetry in the drilling of deep wells for petroleum and geothermal exploration.

U.S. Ser. No. 605,255 describes an acoustic transmission system which employs a transmitter for converting an electrical input signal into acoustic energy within the drill collar. The transmitter includes a pair of spaced transducers which are controlled by a digital circuit. This digital circuit controls phasing of electrical signals to and from the transducers so as to produce an acoustical signal which travels in only one direction. While suitable for its intended purpose, there is a need for improved, less complicated circuitry for use in controlling both acoustic transmitters and receivers in acoustic telemetry systems of the type described in U.S. Ser. No. 605,255.

SUMMARY OF THE INVENTION

In accordance with the present invention, a simplified analog circuit is used for controlling electromechanical transducer pairs in an acoustic telemetry system. The analog circuit of this invention comprises a single electrical resistor which replaces all of the digital components in the digital circuit disclosed in U.S. Ser. No. 605,255. In accordance with this invention, the first transducer in a transducer pair or array is driven in series with the resistor. The voltage drop across this resistor is then amplified and used to drive the second transducer. The voltage drop across the resistor is proportional and in phase with the current to the transducer. This current is approximately 90 degrees out of phase with the driving voltage to the transducer. This phase shift replaces the digital delay required by the digital control circuit of the prior art. The resultant analog control circuit of the present invention is greatly simplified from both a manufacturing and functional standpoint relative to the digital circuitry described in U.S. Ser. No. 605,255.

The above-discussed and other features and advantages of the present invention will be appreciated and understood by those of ordinary skill in the art from the following detailed description and drawings.

BRIEF DESCRIPTION OF THE DRAWINGS

Referring now to the drawings wherein like elements are numbered alike in the several FIGURES:

FIG. 2 is an electrical schematic of an analog control circuit for controlling a pair of acoustic transducers employed as a transmitter in accordance with the present invention;

FIG. 3 is an electrical schematic of an analog control circuit for controlling a pair of acoustic transducers employed as a receiver in accordance with the present invention;

DESCRIPTION OF THE PREFERRED EMBODIMENT

Figure 1:
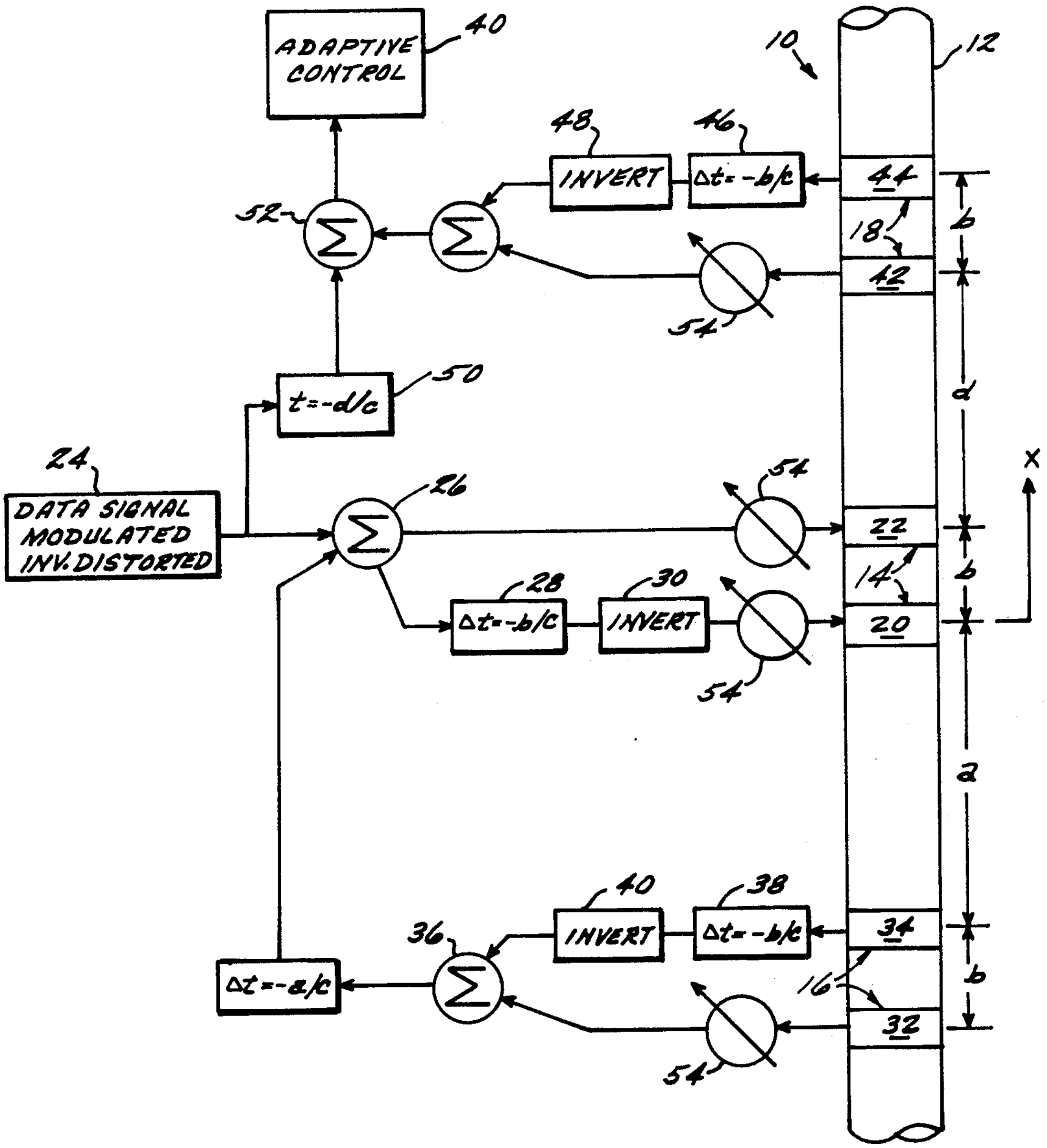
FIG. 1 is a schematic diagram of an acoustic telemetry system as disclosed in U.S. application Ser. No. 605,255 filed Oct. 29, 1990.
Figure 5:
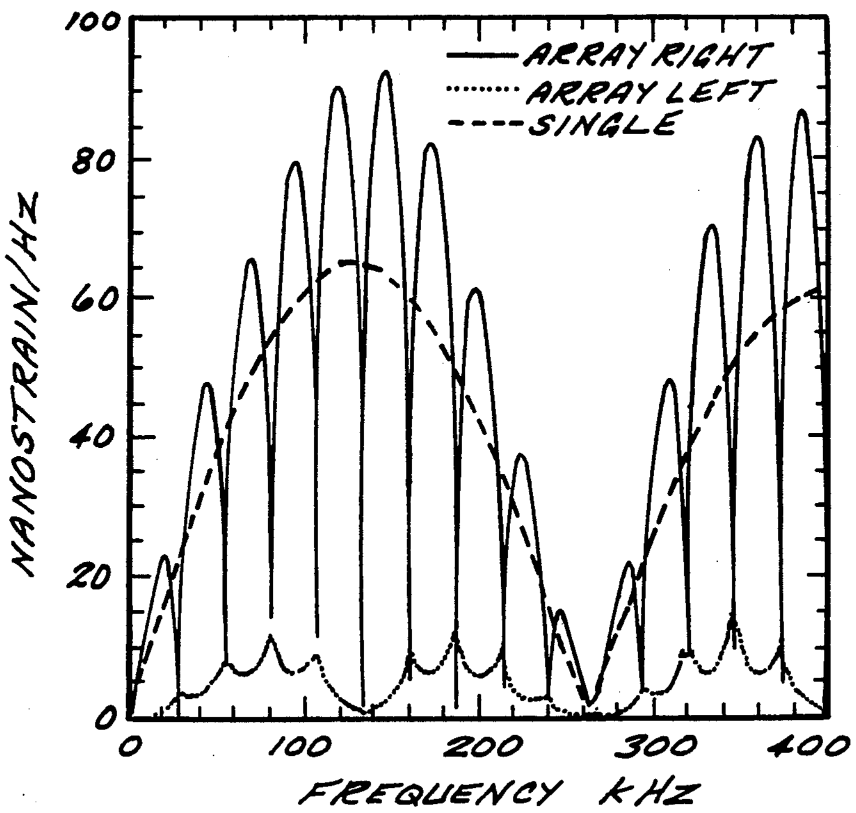
FIG. 5 is a graph showing the calculated impulse response of a source array.

Referring first to FIG. 1 (which corresponds to FIG. 5 of U.S. Ser. No. 605,255), a section 10 of drill collar 12 is shown which is located relatively close to the downhole end of a drillstring and contains apparatus for transmitting a data signal towards the other end of the drillstring while suppressing the transmission of acoustical noise up the drillstring. This apparatus includes a transmitter 14 for transmitting data uphole, but not downhole, a sensor 16 for detecting acoustical noise from downhole and applying it to transmitter 14 to cancel the uphole transmission of the noise, and a sensor 18 for providing adaptive control to transmitter 14 and sensor 16 so as to minimize uphole transmission of noise. Transmitter 14 includes a pair of spaced transducers 20, 22 for converting an electrical input signal into acoustical energy in drill collar 10. These transducers are spaced apart a distance equal to one quarter wavelength of the center frequency of the passband selected for transmission. A data signal from a source 24 is applied directly to uphole transducer 22, preferably through a summing circuit 26. The data signal is also applied to transducer 20 through a delay circuit 28 and an inverting circuit 30. Delay circuit 28 has a delay value equal to distance "b" divided by the speed of sound in drill collar 10 at transmitter 14. The operation of transmitter 14 is described in detail in U.S. Ser. No. 605,255. Thus, with a quarter wavelength spacing for waves at the center of the transmission passband, transmitter 14 transmits an uphole signal having approximately twice the amplitude A of the applied signal and no downhole signal. Noise sensor 16 includes a pair of spaced sensors or transducers 32, 34 which operate in a similar manner to provide an indication of acoustic energy moving uphole, and no indication of energy moving downhole. The output of sensor 32, which sensor may be an accelerometer or strain gage, is an electrical signal that is summed in summing circuit 36 with the output of similar sensor 34, which output is delayed by delay circuit 38 and inverted by inverting circuit 40. If the delay of circuit 38 is equal to the spacing divided by the speed of sound c, downward moving energy is first detected by sensor 34 and delayed, and later detected by downhole sensor 32. The inverted electrical signal from 34 arrives at summing circuit 36 at the same time as the output of sensor 32 providing a net output of zero for downward moving noise.

Control of upward moving noise is provided by adaptive control 41, a conventional control circuit that has an input from a pair of sensors 42, 44. These sensors (identical to sensors 32, 34) also have a corresponding delay circuit 46 and inverter 48 to provide an output indicative of an upward moving wave and no output in response to a downward moving wave. The upward moving wave at control sensor 18 is a mixture of the noise and data that passed transmitter 14. Accordingly, by delaying the data signal in delay circuit 50 and adding the result to the output of sensors 18 with summing circuit 52, an error signal is produced which indicates the effectiveness of noise cancellation. This signal is fed into adaptive control circuit 41 which controls conventional circuitry 54 to adjust voltage amplitudes or phases of the signals being applied in any of sensors 32 and 34 or transmitters 20,22 to minimize the amount of noise being transmitted upward towards the surface.

As is clear from the foregoing, the purpose of electromechanical transducers 20, 22 is to convert an electrical signal into an elastic wave which has an extensional motion along the axis of the drillstring. Similarly, the purposes of the electromechanical transducer pairs 32, 34 and 42, 44 is to produce an electrical signal in response to the same type of elastic wave. It will be appreciated that the delays shown in FIG. 1 for the several transducers 32, 34, 42, 44 and 20, 22 are specific to ideal transducers.

In accordance with the present invention, rather than using digital circuit components to phase the electrical signals to and from the transducers (and thereby producing acoustical signals which travel in one direction only), an alternative method of controlling the transducer arrays is employed using a simplified (relative to the digital circuit) analog circuit. FIG. 2 depicts an embodiment of an analog control circuit in accordance with the present invention for a transducer pair used with a transmitter 14; while FIG. 3 depicts the analog circuit of this invention for use as receiving sensors 16 or 18. The transducers are each comprised of a stack of ceramic (PZT) elements with each ceramic element having electrodes on opposed surfaces thereof.

Referring first to FIG. 2, it will be appreciated that all the digital components of the previously described digital control circuits have been replaced by a single resistor 60. Resistor 60 is connected between a first transducer 20 and a voltage source 62. Transducer 20 is driven in series with resistor 60. The voltage drop across resistor 60 is amplified by amplifier 64 and used to drive the second companion transducer 22. The voltage drop across resistor 60 is proportional and in phase with the current in transducer 22. This current is approximately 90 degrees out of phase with the driving voltage to transducer 20. The values suitable for resistor 60 will depend upon the size of the transducer. Normally, a resistor with 1% of the impedance of the transducer will be acceptable.

Referring now to FIG. 3, an analog control circuit suitable for use with transducer pairs 32, 34 or 42, 44 is shown. The analog control circuit of FIG. 3 includes a single resistor 66 which is connected between a first transducer 32 or 42 and ground 68. The voltage drop across resistor 66 is amplified by amplifier 70. A summing device 72 is operatively connected between amplifier 70 and a second transducer 34 or 44. The drop in electrical potential across resistor 66 is proportional to the current flowing to a first ceramic element in transducers 32, 34 and is approximately 90 degrees out of phase with the electrical potential of the associated electrode. This signal is then amplified and combined with the signal from the neighboring ceramic element. Resistor 66 preferably has a low value which is calculated in the same manner as resistor 60.

It will be appreciated that resistors 60 and 66 actually function in a manner similar to well known current probes. Current probes are commercially available devices which permit one to directly observe and measure the current waveform. Current probes are inductive devices which measure current in a non-invasive manner. With reference to FIGS. 2 and 3, a current probe may be used in place of resistors 60 and/or 66. Current probes are available from Tektronix and a suitable Tektronix current probe is Type 6302/AM 503.

PRINCIPLE OF OPERATION

The principle of operation for each analog circuit of FIGS. 2 and 3 will now be discussed with respect to an ideal model shown in FIG. 4 wherein a brass rod (analogous to a drillstring) is shown at 76 having a pair of ceramic element transducers 78, 80 in an array for controlling a transmitter (hereinafter sometimes referred to as the source array) and a pair of ceramic element transducers 82, 84 for controlling the receiving sensors (hereinafter sometimes referred to as the gage array). Thus, the transducers at $x=x_1$ and $x=x_2$ are used as sources, and the transducers at $x=x_3$ and $x=x_4$ are used as gages. In the following discussions it is assumed that mechanical waves do not distort as they propagate along the rod and through the various elements of ceramic and brass; that is, they are steady propagating waves which only change shape when they are reflected off the ends of the brass rod at $x=0$ and $x=x_M$. It is also assumed that the source transducers are matched and have identical responses to an electrical driving signal. Similarly, the gages have identical electrical outputs when subjected to the same mechanical disturbance. The operation of the model can be explained by separately examining the functions of the source array and the gage array. The gage array is discussed first.

In the most general situation involving elastic extensional disturbances in the rod, these disturbances can be represented by two functions, $f_r(t-x/c)$ and $f_l(t+x/c)$. The variable x represents position along the rod, and t represents time. The parameter c represents the speed of propagation of elastic extensional waves in the rod. For the following discussion, it is assumed that c is not a function of x; that is, the brass rod and the PZT ceramics have the same value of c. It is also assumed that the acoustical impedance is constant along the length of the waveguide. The acoustical impedance is the product of the mass density, speed of propagation, and cross-sectional area of the waveguide.

The functions $f_r(t-x/c)$ and $f_l(t+x/c)$ represent steady waves which propagate right and left, respectively. The gages at locations $x_3$ and $x_4$ respond electrically to these waves. This response is measured as a change in electrical potential across the electrodes of the PZT ceramic. This potential is represented by $v_i(t)$.

$$v_i(t)=V[f_r(t-x_i/c)+f_l(t+x_i/c)] \quad (1)$$

where i=3,4. To simplify this discussion, the transfer function of the transducers is assumed to be a constant V.

ANALOG SOURCE ARRAY When both sources operate simultaneously, the strain in the rod, s(t,x), is given by $$s(t,x)=f_1(t-((x-x_1)/c)+f_2(t-((x-x_2)/c) \quad (2)$$

for $x>x_2>x_1$ and $$s(t,x)=f_1(t+((x-x_1)/c)+f_2(t+((x-x_2)/c) \quad (3)$$

for $x<x_1<x_2$ where $f_1$ and $f_2$ represent the output of sources 1 and 2.

When the analog circuit shown in FIG. 2 is used, the waves produced by the source array have the following relationship:

$$f_2(t) = -\frac{1}{\omega_s}\frac{df_1(t)}{dt}. \quad (4)$$

When this relationship is substituted into Equations 2 and 3, the Fourier transform of the result is $$S(\omega,x) = F_1(\omega,x)\left\{1 + \frac{\omega}{\omega_s}\exp\left[i\frac{\pi}{2}\left(1 - \frac{\omega}{\omega_s}\right)\right]\right\} \quad (5)$$

for $x>x_2>x_1$, and $$S(\omega,x) = F_1(\omega,x)\left\{1 + \frac{\omega}{\omega_s}\exp\left[i\frac{\pi}{2}\left(1 + \frac{\omega}{\omega_s}\right)\right]\right\} \quad (6)$$

for $x<x_1<x_2$.

At all frequencies except $\omega=\omega_s$ the analog circuit of FIG. 2 produces waves which travel in both directions. In the neighborhood of $\omega_s$, good directional discrimination is achieved by this circuit.

ANALOG GAGE ARRAY

Turning now to the analog circuit of FIG. 3, if a small resistance R is used in this circuit, the drop in electrical potential across this resistor is proportional to $dv_4/dt$. The amplifier 70 in this circuit can be adjusted so that the output of the analog circuit $m_a(t)$ is $$m_a(t) = v_3(t) + \frac{1}{\omega_g}\frac{dv_4(t)}{dt}. \quad (7)$$

The Fourier transform of this relation is $$M_a(\omega) = V\left\{F_r(\omega)\left[1 - \frac{\omega}{\omega_g}\exp\left(i\frac{\pi}{2}\left(1 + \frac{\omega}{\omega_g}\right)\right)\right]+\right. \quad (8)$$

$$\left.F_1(\omega)\left[1 - \frac{\omega}{\omega_g}\exp\left(i\frac{\pi}{2}\left(1 - \frac{\omega}{\omega_g}\right)\right)\right]\right\}. \quad (9)$$

The output of the analog circuit depends on both $F_r(\omega)$ and $F_1(\omega)$ at all frequencies except $\omega=\omega_g$. In the neighborhood of this frequency, good directional discrimination is obtained.

ANALYSIS

Figure 4:
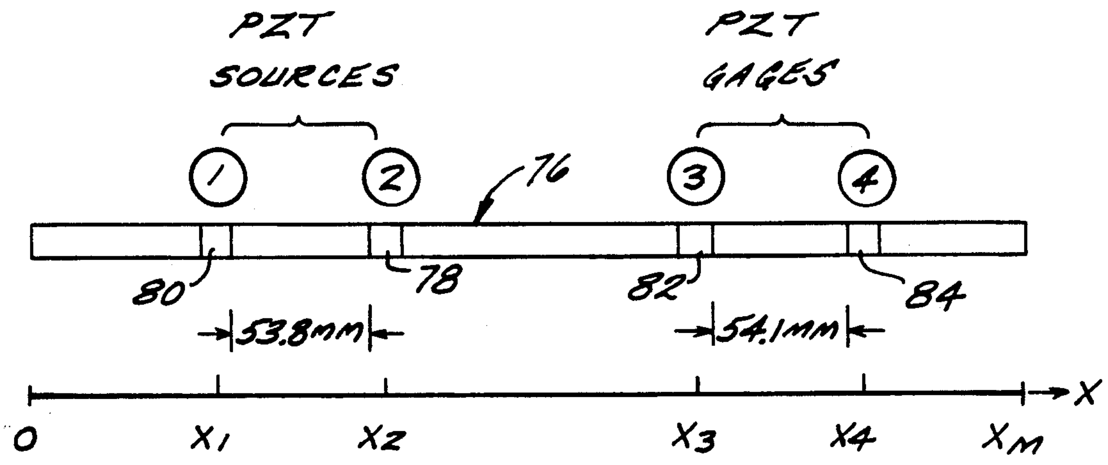
FIG. 4 is a schematic of a model for analyzing the analog control circuit of the present invention.

The following is an analysis conducted on actual (as opposed to ideal) source and gage transducers of the type shown in FIG. 4. Details of the experimental set-up for this analysis are described in the Appendix attached to U.S. Ser. No. 005,255.

ANALOG SOURCE ARRAY

For purposes of this analysis, a single source is isolated in an infinite brass rod. The response of the source transducer is determined by applying an electrical impulse to its electrodes. The impulse has a width of $\Delta t=1.257$ s and an amplitude of $1/\Delta t$. The strain in the brass rod is measured with a strain gage placed adjacent to the transducer.

The impulse response is calculated for 4096 time steps. The fast Fourier transform of the strain-gage record is shown in FIG. 5 as the dashed line. This figure also includes the results for the source array.

The fast Fourier transform of an impulse in strain appears as a straight horizontal line in this plot. The calculated strain response for a single source differs significantly from an impulse in strain. The peak response occurs at about 130 kHz, and a null response occurs at about 265 kHz.

Figure 6:
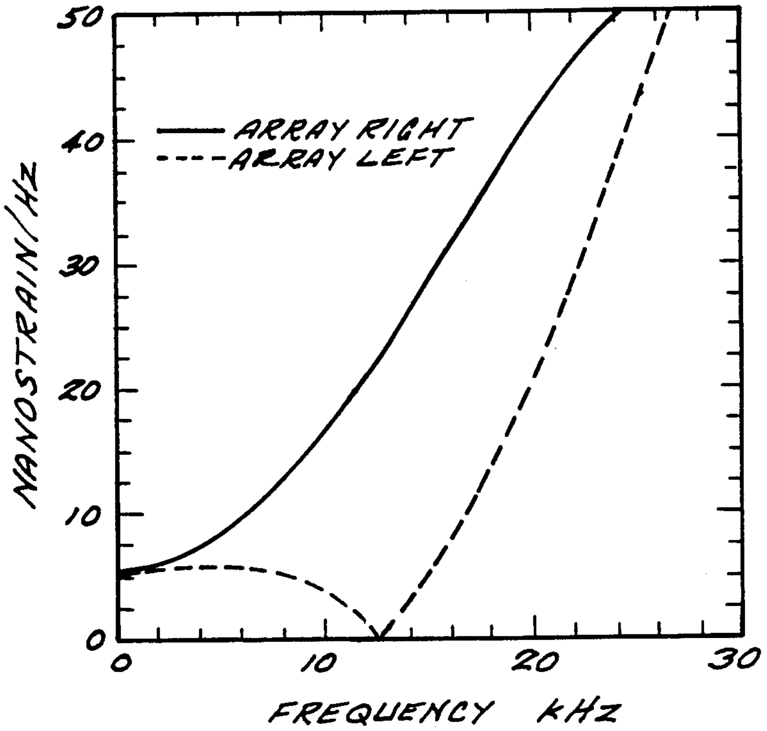
FIG. 6 is a graph showing the calculated impulse response for a source array with analog control.

The source array is now connected to the analog circuit shown in FIG. 2. The circuit is first driven by a signal which consists of ten sine waves of a frequency of 13.3 kHz. The gain of the amplifier is adjusted until the driving signals to both source transducers are equal. The circuit is then driven with the impulse function. The responses of the two strain gages are computed for 4096 time steps. The fast Fourier transforms of the impulse responses of the two strain gages are shown in FIG. 6. Only the portion of the frequency spectrum in the neighborhood of 13.3 kHz is shown.

The method used to adjust the gain of the amplifier optimizes the directional discrimination of the transducer array at 13.3 kHz. According to Equation 6, the left strain gage should have a null in its response at 13.3 kHz. A null is observed but at a slightly lower frequency. Changes of ten percent in the gain of the amplifier are insufficient to shift this null to 13.3 kHz. This discrepancy is attributable to the acoustic impedance mismatch between the transducers and the brass rod as well as the finite dimensions of the transducers.

Figure 7:
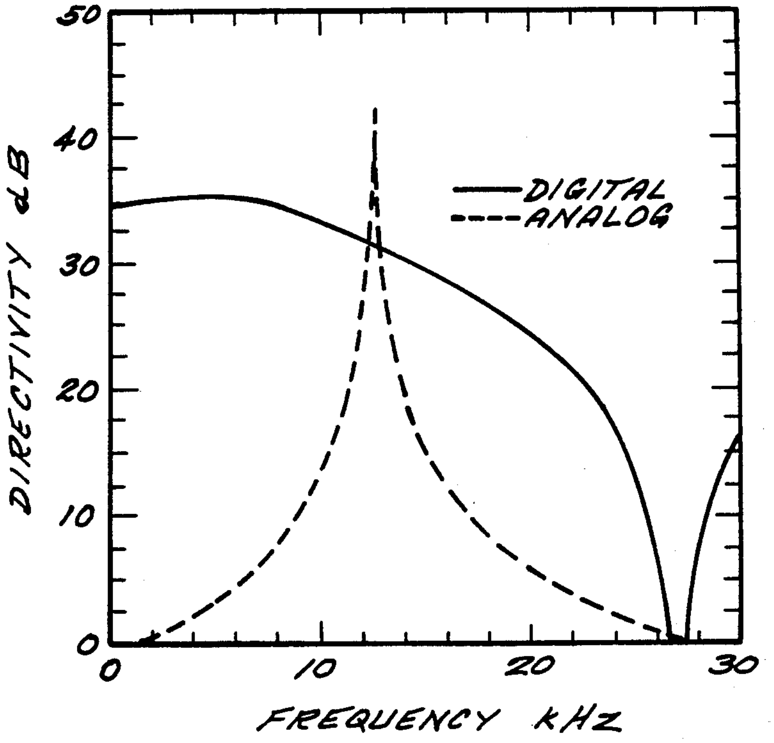
FIG. 7 is a graph showing the directivity of a source array with analog control as compared to digital control.

The directivity D(ω) of the gage array is defined as $$D(\omega)=20\ log_{10}]R(\omega)] \qquad (10)$$

where R(ω) is the frequency amplitude of the right strain record divided by the frequency amplitude of the left strain record. FIG. 7 contains a comparison of the source array with digital control and analog control. The digital circuit exhibits good directivity over a large frequency range. The analog circuit has good directivity over a narrower frequency range.

ANALOG GAGE ARRAY

Figure 8:
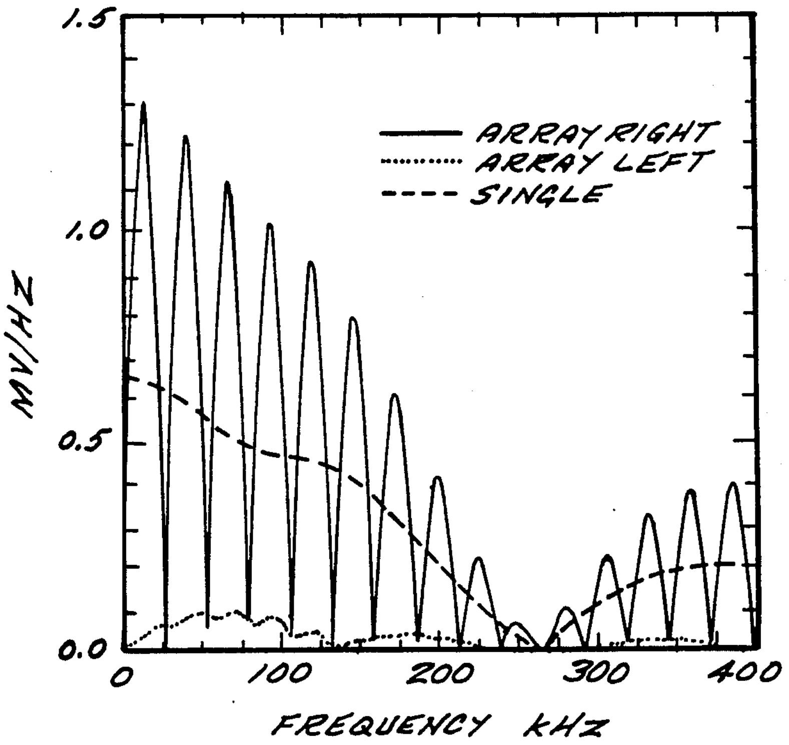
FIG. 8 is a graph showing the calculated impulse response of a gage array.

For purposes of this analysis, a single gage is isolated in an infinite brass rod. The response of the gage transducer is determined by generating a strain wave in the brass rod which travels through the gage. The form of this wave is an impulse in strain of width Δt and amplitude 1/Δt. The gage response is calculated for 4096 time steps. The fast Fourier transform of the gage record is shown in FIG. 8 as a dashed line. The figure also includes the results for the gage array. Because of the finite size of the gage and the difference in acoustical impedance between the brass and the ceramic, the response of the single gage deviates from a horizontal line.

Figure 9:
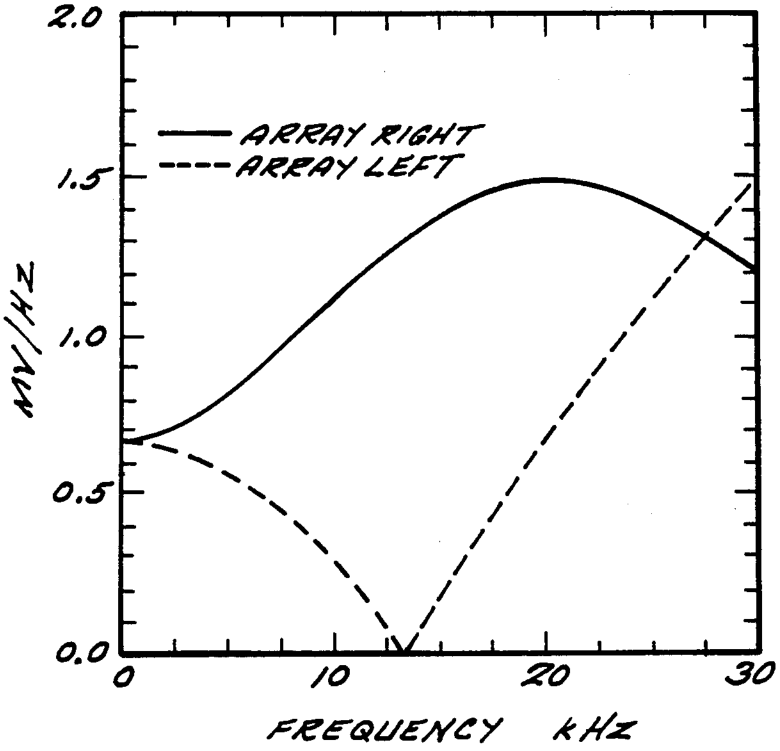
FIG. 9 is a graph showing the calculated impulse response for a gage array with analog control.

The gage array is now connected to the analog circuit shown in FIG. 3. The gain of the amplifier is adjusted by using ten sine waves of 13.3 kHz. An impulse strain is then sent through the gage array. When the wave propagates to the right, the response of the analog circuit is calculated for 4096 time steps. The fast Fourier transform is shown as the solid line in FIG. 9. In this case, the null in the response for the wave traveling to the left occurs at 13.3 kHz.

Figure 10:
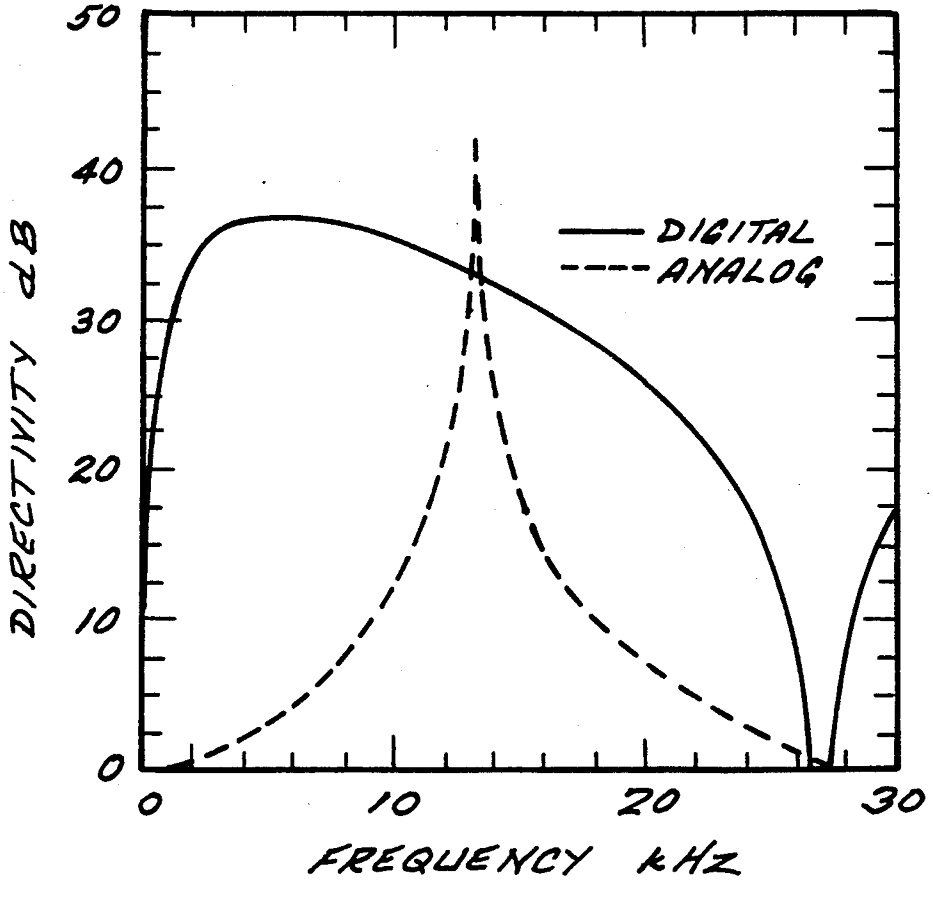
FIG. 10 is a graph showing the directivity of a gage array with analog control as compared to digital control.

The directivities of the gage arrays using the analog and a digital control are compared in FIG. 10. These results are similar to those for the source array. The digital circuit gives good response over a broader range of frequencies.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An analog circuit for controlling electromechanical transmitter transducer pairs in an acoustic telemetry system which further includes a drill collar segment having a first acoustic transducer spaced from a second acoustic transducer, the analog control circuit comprising:

volt source means;

resistor means connected between said first transducer and said volt source means;

amplifier means connected between said resistor means and said second transducer; and wherein said first transducer is driven in series with said resistor means and wherein any voltage drop across said resistor means is amplified by said amplifier means and used to drive said second transducer so that the voltage drop across said resistor means is proportional and in phase with the current in said second transducer.

2. The circuit of claim 1 wherein:

said current in said second transducer is about 90 degrees out of phase with the driving voltage in said first transducer.

3. The circuit of claim 1 wherein said first and second transducer have an impedance value and wherein:

said resistor means has a value of about 1% of the impedance value of said first and second transducer.

4. An analog circuit for controlling electromechanical receiver transducer pairs in an acoustic telemetry system which further includes a drill collar segment having a first acoustic transducer spaced from a second acoustic transducer, the analog control circuit comprising:

resistor means connected between said first transducer and ground;

summing means connected to said second transducer means;

amplifier means connected between said resistor means and said summing means; and wherein any voltage drop across said resistor means is proportional to current flowing in said first transducer means and wherein said voltage drop is amplified by said amplifier means and combined in said summing means with any voltage signal in said second transducer to provide an output signal defining a received signal.

5. The circuit of claim 4 wherein:

said current in said second transducer is about 90 degrees out of phase with the driving voltage in said first transducer.

6. The circuit of claim 4 wherein said first and second transducer have an impedance value and wherein:

said resistor means has a value of about 1% of the impedance value of said first and second transducer.

7. An analog circuit for controlling electromechanical transmitter transducer pairs in an acoustic telemetry system which further includes a drill collar segment having a first acoustic transducer spaced from a second acoustic transducer, the analog control circuit comprising:

volt source means;

current probe means connected between said first transducer and said volt source means;

amplifier means connected between said current probe means and said second transducer; and wherein said first transducer is driven in series with said current probe means and wherein any voltage drop across said current probe means is amplified by said amplifier means and used to drive said second transducer so that the voltage drop across said current probe means is proportional and in phase with the current in said second transducer.

8. The circuit of claim 7 wherein:

said current in said second transducer is about 90 degrees out of phase with the driving voltage in said first transducer.

9. An analog circuit for controlling electromechanical receiver transducer pairs in an acoustic telemetry system which further includes a drill collar segment having a first acoustic transducer spaced from a second acoustic transducer, the analog control circuit comprising:

current probe means connected between said first transducer and ground;

summing means connected to said second transducer means;

amplifier means connected between said current probe means and said summing means; and wherein any voltage drop across said current probe means is proportional to current flowing in said first transducer means and wherein said voltage drop is amplified by said amplifier means and combined in said summing means with any voltage signal in said second transducer to provide an output signal defining a received signal.

10. The circuit of claim 9 wherein:

said current in said second transducer is about 90 degrees out of phase with the driving voltage in said first transducer.

* * * * *

UNITED STATES PATENT AND TRADEMARK OFFICE

CERTIFICATE OF CORRECTION

PATENT NO. : 5,056,067

DATED : OCTOBER 8, 1991

INVENTOR(S) : DOUGLAS S. DRUMHELLER

It is certified that error appears in the above-identified patent and that said Letters Patent is hereby corrected as shown below:

Column 1, line 4 insert, -- The U.S. Government has rights in this invention under contract DE-AC04-76DP00789 between American Telephone and Telegraph Company and the Department of Energy. --.

Signed and Sealed this

Twenty-third Day of March, 1993

*Attest:*

STEPHEN G. KUNIN

*Attesting Officer*

*Acting Commissioner of Patents and Trademarks*